United States Patent
Stinson, III et al.

(10) Patent No.: US 9,143,508 B2
(45) Date of Patent: Sep. 22, 2015

(54) SERVICE LOCATION BASED AUTHENTICATION

(75) Inventors: Willis David Stinson, III, Sherborn, MA (US); Bhaskar Purimetla, Ashland, MA (US); Anil Chintalapudi, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 12/982,304

(22) Filed: Dec. 30, 2010

(65) Prior Publication Data

US 2012/0173869 A1    Jul. 5, 2012

(51) Int. Cl.
*H04L 9/32*    (2006.01)
*H04L 29/06*    (2006.01)

(52) U.S. Cl.
CPC ........ *H04L 63/0876* (2013.01); *H04L 63/0236* (2013.01); *H04L 63/102* (2013.01); *H04L 63/0442* (2013.01)

(58) Field of Classification Search
None
See application file for complete search history.

(56) References Cited

U.S. PATENT DOCUMENTS

| | | | |
|---|---|---|---|
| 2005/0018679 A1* | 1/2005 | Iwami | 370/392 |
| 2005/0201363 A1* | 9/2005 | Gilchrist et al. | 370/352 |
| 2006/0015580 A1* | 1/2006 | Gabriel et al. | 709/219 |
| 2006/0067342 A1* | 3/2006 | Dispensa | 370/401 |
| 2006/0233144 A1* | 10/2006 | Matsumoto | 370/338 |
| 2007/0033258 A1* | 2/2007 | Vasilaky et al. | 709/206 |
| 2010/0138900 A1* | 6/2010 | Peterka et al. | 726/4 |

* cited by examiner

*Primary Examiner* — Jung Kim
*Assistant Examiner* — Adrian Stoica

(57) ABSTRACT

A computer is configured to receive a request to access an application, the request having a header. The header includes a source address and an encrypted address generated based on the source address. The computer is further configured to generate a decrypted address from the encrypted address. The computer is further configured to determine whether the source address and the decrypted address match, transmit the source address to a data store, and determine whether a customer profile corresponding to the source address is found within the data store.

21 Claims, 3 Drawing Sheets

SERVICE LOCATION BASED AUTHENTICATION

BACKGROUND

A content service provider may offer services at a customer premises e.g., services such as audio and video programming, access to the World Wide Web, social networking applications, cloud content management, blogs, etc. User authentication for such services is often provided using a conventional username and password authentication model (UPA). This model requires a user to manually provide a user name and password to gain access to services and applications. Unfortunately, present mechanisms for authenticating users for services without manual steps are lacking.

DETAILED DESCRIPTION

Figure 1:
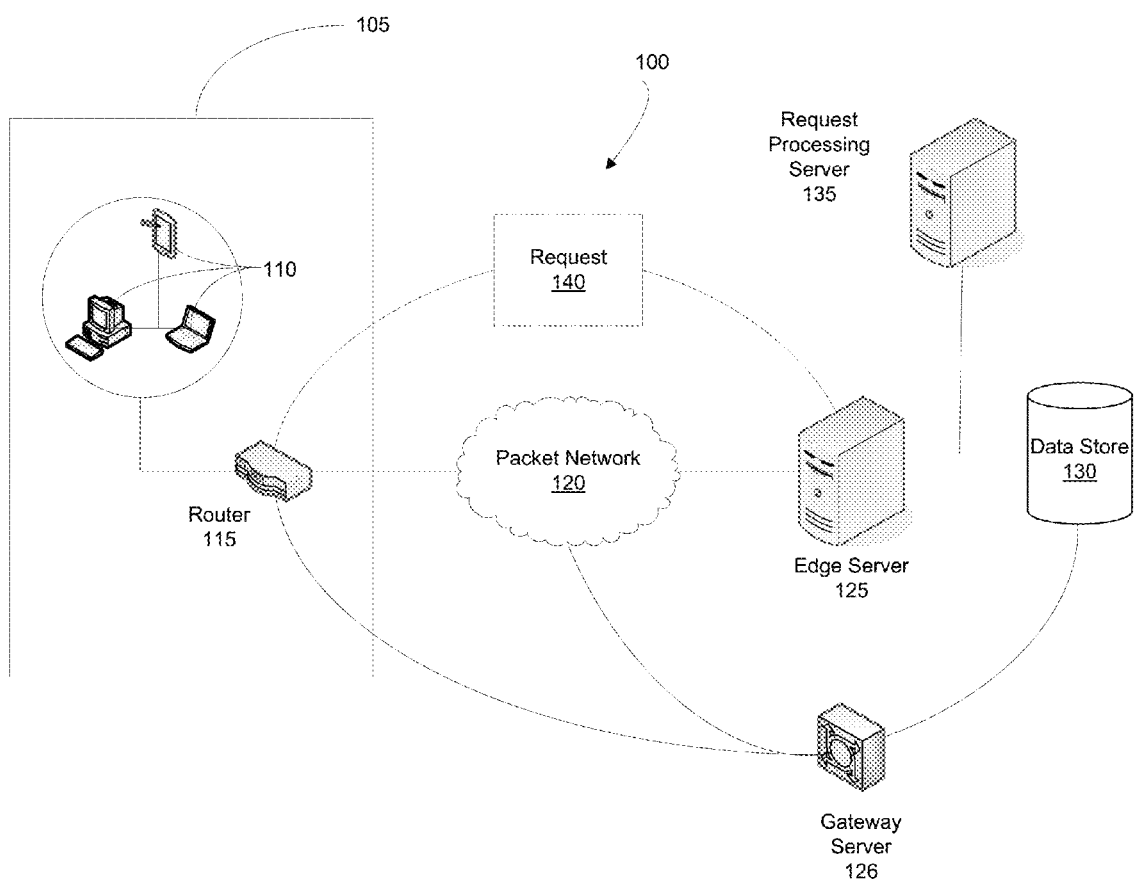
FIG. 1 illustrates an exemplary system for authenticating service requests.

FIG. 1 illustrates an exemplary system 100 for authenticating a request 140 based on a user's source address, e.g., internet protocol (IP) address, associated with a customer premises 105. Customer premises 105 generally includes one or more user devices 110 connected to a packet network 120, such as the internet, via a gateway 115. A service provider generally uses at least one edge server 125 which caches web objects for performance, and which communicates with device 110 and a network inventory data store 130, e.g., via gateway 115. A gateway server 126 may also communicate with gateway 115 and network inventory data store 130. Data store 130 may be included within edge server 125 or gateway server 126, or may be part of a separate computing device or system. A request processing server 135 may selectively communicate with edge server 125 and data store 130, e.g., to both authenticate and authorize a request 140. The network inventory data store 130 may be used by the request processing server 135 to determine if request 140 originates from a valid address served by the service provider.

The service provider may offer services at customer premises 105 such as audio and video programming, access to the World Wide Web, social networking applications, cloud content management, blogs, etc. In addition to providing access to paid-for services, the service provider may employ user authentication to provide secure online access to subscriber account management features such as online ordering, billing, and repair. Devices 110 within the customer premises 105 may be able to access subscriptions to some or all of these services. When a request 140 for one of such media services, or a subset of available services is received from a device 110, e.g., to view media content, credentials included in the request are verified, e.g., according to instructions in request processing server 135, before the request 140 is granted. Thus, a secure mechanism is provided for authenticating device 110 without requiring a user to manually input credentials, e.g., username and password. For example, request 140 may be authenticated via request processing server 135 according to an address of device 110. Further, once device 110 has been authenticated, server 135 may determine whether device 110 is authorized to receive a particular service, e.g., a particular video program, game, etc., that has been requested. For example, server 135 may verify user subscription information in data store 130 before the user may receive the requested service.

The link between servers 125 and 135 may traverse a third party network, for example where edge server 125 is operated by a party other than the service provider. Therefore, before performing authorization operations on source address 205, the service provider may require an encryption mechanism between servers 125 and 135 to validated, or may seek to ensure the integrity of the source address 205.

Authentication of a request 140 is generally achieved using an encryption scheme, as mentioned, implemented between edge server 125 and request processing server 135. Initially, edge server 125 may receive request 140 from user device 110 at customer premises 105 via gateway 115. Each request packet generally includes a packet header, e.g., a header in an IP (Internet Protocol) packet. Header 200 generally includes fields that further define request 140, e.g., a source address. Source address 205 is the address associated with device 110 making request 140, e.g., an IP address. Source address 205 and other header fields are discussed in more detail below with respect to FIG. 2.

In general, encryption involves converting plain text into cyphertext, i.e., a text string whose meaning cannot be discerned by a human reader. The text may be sent from a sending device to a receiving device, where the sender and receiver share a key. The key is used to encrypt the message at the sender and decrypt the message at the receiver. The key may be a private key, which is a unique or substantially unique value known only to the sender and receiver. Alternatively, the key may be a public key which uses a combination of a public key, available to any receiver from a sender, and a private key, only available to the receiver. In this instance, to decode an encrypted value, a receiver must use the public key provided by the sender, and its own private key. A key may be used to generate a hash value, e.g., converting plain text into cyphertext.

Figure 3:
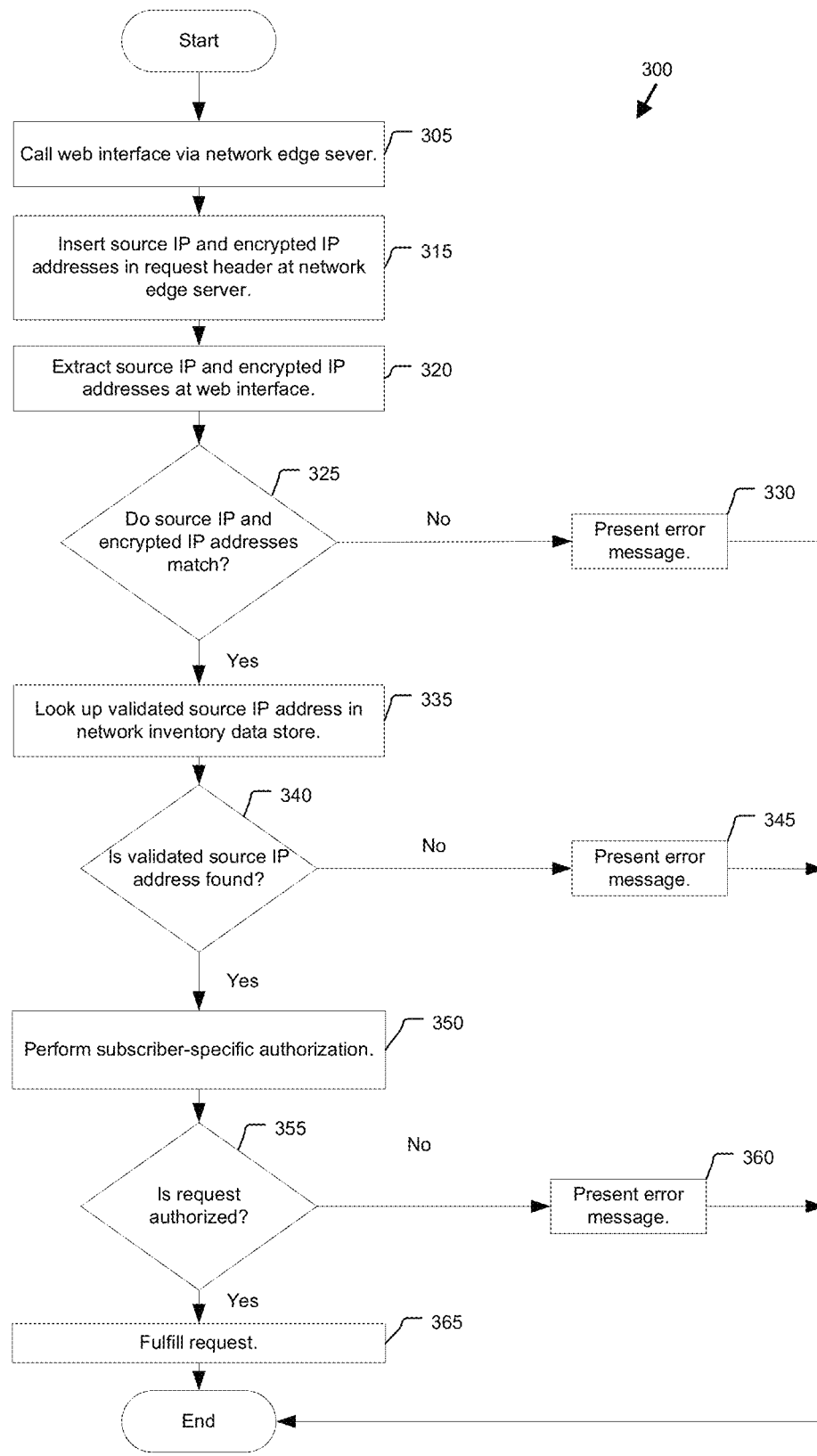
FIG. 3 illustrates an exemplary process flow for authenticating service requests.

An encryption key used in the system 100 is a secret key known only to edge server 125 and request processing server 135. With reference to FIG. 3, discussed further below, the encryption key transforms a source address 205 to an encrypted address 210. Specifically, edge server 125 reads source address 205 from a packet header. The edge server 125 then generates an encrypted address 210 using the encryption key. The encryption key may be retrieved, randomly, from a pool of such keys stored in or accessible by request processing server 135, or may be generated according to some other mechanism for generating such keys. The key may alternatively be generated by edge server 125. Edge server 125 and request processing server 135 may share the encryption key via a secure network provided by the service provider, or via some other mechanism.

Once edge server 125 has generated the encrypted address 210, edge server 125 writes encrypted address 210 to packet 200, as shown by way of example in FIG. 2, and transmits request 140 to request processing server 135. Request processing server 135 then decrypts encrypted address 210 according to the key shared with edge server 125, and compares the decrypted address with the original unencrypted source address 205. If the addresses match, then assurance is provided that the decrypted address reflects a valid source address 205 for the service provider. The source address 205 can then be compared to existing addresses in the network inventory database 130 to see if it is an address served by the service provider. That is, if the address 205 is located in data store 130, then request 140 is authenticated. By encrypting source address 205, request processing server 135 can verify that request 140 is being sent from a secure source.

System 100 may take various forms and include multiple and/or alternate components than the examples shown in FIG. 1. User device 110 may be any type of device capable of communicating with the service provider and generally includes a processor, as well as a volatile memory and/or some other computer readable medium. The memory and/or medium stores instructions executable by the processor for carrying out processes disclosed herein. For example, user device 110 may be a laptop computer, tablet computer such as the iPad™, a mobile telephone or smartphone, personal digital assistant (PDA), e-book reader, conventional television, high-definition television (HDTV), among others. User device 110 may receive requested content via packet network 120. Request 140 may be a request for content such as audio and video programming, access to the World Wide Web, social networking applications, cloud content management, blogs, etc. In addition to providing access to paid-for services, authentication may be used to provide secure online access to subscriber account management features such as online ordering, billing, and repair.

User device 110 may include a user interface (not shown) such as a Graphical User Interface (GUI), which may display content received from the service provider. The GUI may also allow users to request content from the service provider. For example, the GUI may display descriptions, icons, titles, or other representations of available content from the service provider such as applications to be accessed, available media content such as video (e.g., movies and other programming), audio, etc. The user may then select desired media content from the GUI.

Gateway 115 may include a broadband home router (BHR) and/or other customer premises equipment, such as a modem, etc., used for establishing and operating, or connecting to, a network in customer premises 105 such as a home network or local area network (LAN). Gateway 115 may be used to route communications between a customer premises 105 and the service provider. Gateway 115 may be configured to provide various network services to various devices 110. Gateway may also include other mechanisms for facilitating connection to the network 120, such as an Optical Network Terminal (ONT), Data Over Cable Service Interface Specification (DOCSIS) or cellular base station such as a femtocell.

Gateway 115 may include a router having a processor as well as a memory and/or a computer readable medium for storing instructions executable by the processor. Gateway 115 may include any number and variety of different input and output devices and/or interfaces to provide various network services to such devices. For example, gateway 115 may be configured to communicate with user device 110, using one or more mechanisms such as Ethernet, Bluetooth®, Wi-Fi®, WiFi protocols (802.11b, 802.11g, 802.11n, etc.), or any other wired or wireless communications mechanism. Further, gateway 115 may include a digital video recorder (DVR), a personal video recorder (PVR), applications to provide and/or facilitate various network services, memory for buffer management, or some other hardware and/or software to provide and/or enhance one or more network services.

Packet network 120 is generally an internet protocol (IP) network. The network 120 may use wireless and/or wired transport and protocols. As such, network 120 may use protocols for transporting data, such as user datagram protocol (UDP), transport control protocol (TCP), hypertext transfer protocol (HTTP), etc. Further, network 120 may include a variety of networks such as wide area network (WAN), e.g., the Internet, a local area network (LAN), etc. Network 120 may be used to transport a variety of data, including multimedia data such as audio and video. Further, fiber optic cable may be used to provide data to customer premises 105, including to user device 110. An optical network terminal (ONT) (not shown) may be situated adjacent to a customer premises, for the purpose of providing data received over an optical line to customer premises 105, including user device 110. An optical line terminal (OLT) may provide data to one or more optical network terminals (ONTs). However, as stated above, it is possible that device 110 receives data via mechanisms other than fiber optic cables.

The service provider may employ any system, device, and/or facility that provides customer premises 105 with network services via packet network 120. These services may include a subscriber television network such as a cable television network, satellite television network, optical fiber television network, a provider-specific television network (e.g., a Verizon® FIOS® network and/or a TiVo® network), or any combination thereof. Alternatively or additionally, customer premises 105 may access different networks providing subscribers with access to other types of media content, including a satellite media broadcasting network or terrestrial media broadcasting network (e.g., satellite radio). The service provider may include a provider of various wireless services, and provide voice and data services to user devices 110 according to a user profile. For instance, the service provider may utilize one or more databases for storing user profiles.

Edge server 125 generally includes a processor as well as a memory and/or a computer readable medium such as a disk or the like for storing data and computer executable-instructions. Edge server 125 may provide caching services, and has access to different layers of the IP protocol stack including layer 3. Edge server 125 may be included at the service provider, or may be remote from the service provider. Further, edge server 125 may be associated with one or more service providers separate from the service provider associated with the request processing server 135. Thus, each of the edge server 125 and request processing server 135 may be associated with different service providers.

As described in detail below, edge server 125 receives request 140 from customer premises 105. Edge server 125 may then write an encrypted address 210 into a packet header 201. For example, packet header 201 may be an HTTP header that may include any name-value pair (sometimes also referred to as an attribute-value or key-value pair). Such pairs allow for a set of two data items to be linked, e.g., an identifier and a value. The identifier and value may be separated by a character such as a comma. Encrypted address 210 may be added to the header using a name-value pair, e.g., an identifier to indicate that an accompanying value is an encrypted address 210, and the value representing the encrypted address 210, as explained below with respect to FIG. 2b. For example, source address 205 may be a value such as 207.239.41.29. Once encrypted, the encrypted value may be written to the header as a name-value pair, e.g., Encrypted Address, HH1pzeET3sQ1VMjcptVkpQ.

Encrypted address 210 is generated by edge server 125 using an encryption scheme known only to edge server 125 and request processing server 135. Edge server 125 may encrypt source address 205 by applying the encryption key to generate a hash value. This may be done using Advanced Encryption Standard (AES) (128, 256 bit encryption), Triple Data Encryption Algorithm (3DES) (128 bit), or other encryption process. AES is a widely used symmetric-key encryption that creates a 128, 192 or 256 bit hash value. Alternatively, one-way hash encryption may also be used to generate encrypted address 210 from source address 205. The same one-way hash encryption may be used during source address 205 and encrypted address 210 match process. This may be done using Message-Digest algorithm 5 (MD5) (128 bit encryption), SHA-256 (256 bit encryption), or other encryption processes. MD5 is a widely used hash function that creates a 128 bit hash value. A hash value generally provides a substantially unique, compact numerical representation of a piece of data. The encryption key that creates the hash value is the same key that is used to decrypt the hash value to return the original value, or in this instance, source address 205. Encrypted address 210 is then written to packet 201, which is discussed in more detail below with respect to FIGS. 2a and 2b.

An explanation of AES is provided by the document Advanced Encryption Standard (AES), which presently may be found at http://csrc.nist.gov/publications/fips/fips197/fips-197.pdf, and which is fully incorporated by reference herein in its entirety. An explanation for 3DES is provided by the document Data Encryption Standard (DES), which presently may be found at http://www.itl.nist.gov/fipspubs/fip46-2.htm, and which is fully incorporated by reference herein in its entirety.

Gateway server 126 may be in communication with data store 130 and gateway 115 via network 120. Additionally or alternatively, gateway server 126 may be in direct communication with gateway 115 through a dedicated connection. For example, gateway 126 may be connected to gateway 115 and data store 130 via a conventional telephone network, such as the public switched telephone network (PSTN). Data may be transferred from gateway 115 to data store 130 using the infrastructure of the PSTN and without using the network 120. Gateway server 126 may receive Remote Authentication Dial In User Service (RADIUS) records from gateway 115. RADIUS provides Authentication, Authorization, and Accounting (AAA) information with respect to the use of a network service. These records are generated in real-time or in near real-time and contain network attributes for each user such as usage information, IP address, start time, stop time and check point transaction data. These records are securely sent to data store 130 for storage and may be used to authenticate and verify request 140, as described herein. In addition, although not shown, gateway server 126 may also connect gateway 115 to packet network 120.

Data store 130 generally stores information related to specific users, locations, and a network configuration providing service to user at those locations. For example, data store 130 may include information concerning each user, i.e., a user profile. The user profile may include subscription information for each user, as well as a current address, e.g., IP address, associated with each user. Subscription information may include payment information for each user. For example, each user may subscribe to and pay for certain services, such as Internet, TV, and phone service. Further, each user may subscribe to certain levels of service. The levels of services may include any combination of available channels or pay-per-view services. For instance, a standard level of service may include basic cable channels, while a premium level of service may include additional channels such as high-definition channels, or other premium stations such as HBO® and SHOWTIME®.

Data store 130 may alternatively or additionally store the RADIUS usage records. These records may be received via the PSTN, as described above, and stored based on their time stamp and thus, data store 130 generally may recognize the most recently stored record and in turn find the most recent address, e.g., source or IP address, associated with a user. This address may later be used to authenticate and verify a request. The source address may be the IP address associated with gateway 115 assigned by a Dynamic Host Configuration Protocol (DHCP Server). The assigned address may also be associated with some other customer premises equipment. Further, at any given time, an IP address may be assigned to a single customer premise.

As discussed above, data store 130 may update the user profile when data related to the user changes e.g., the level of service has been changed or the network address associated with device 110 has changed. For example, in the event that a user's subscription information has changed, data store 130 may receive updated subscription information for a user profile from any or all of the request processing server 135, gateway 115, and gateway server 126. In addition, request processing server 135 may also update the records at data store 130, which in turn may update the user profile. Request processing server 135 may be in communication with edge server 125 and data store 130. Request processing server 135 shares the encryption scheme with edge server 125 and uses the encryption scheme to decrypt encrypted address 210 created by edge server 125. The decrypted address is generally compared to source address 205 by request processing server 135 to determine if the values match. If the values match, then source address 205 may be considered valid, and subsequent authorization may follow based on network and subscription information in data store 130, e.g., as described in more detail below.

In general, computing devices may employ any of a number of well known computer operating systems, including, but by no means limited to, known versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., and the Linux operating system. Computing devices may include any one of a number of well known computing devices, including, without limitation, a computer workstation, a desktop, notebook, laptop, tablet computer or handheld computer, smartphone, or some other known computing device.

Computing devices generally each include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as data store 130, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device 110 employing a computer operating system such as one of those mentioned above, and are accessed via a network in any one or more of a variety of manners. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Figure 2A:
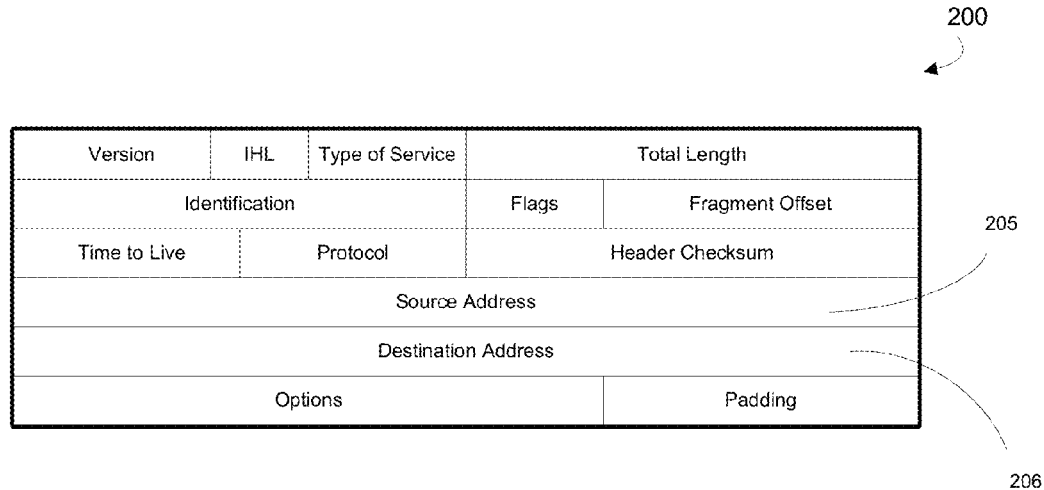
FIGS. 2a and 2b illustrate an exemplary packet header.
Figure 2B:
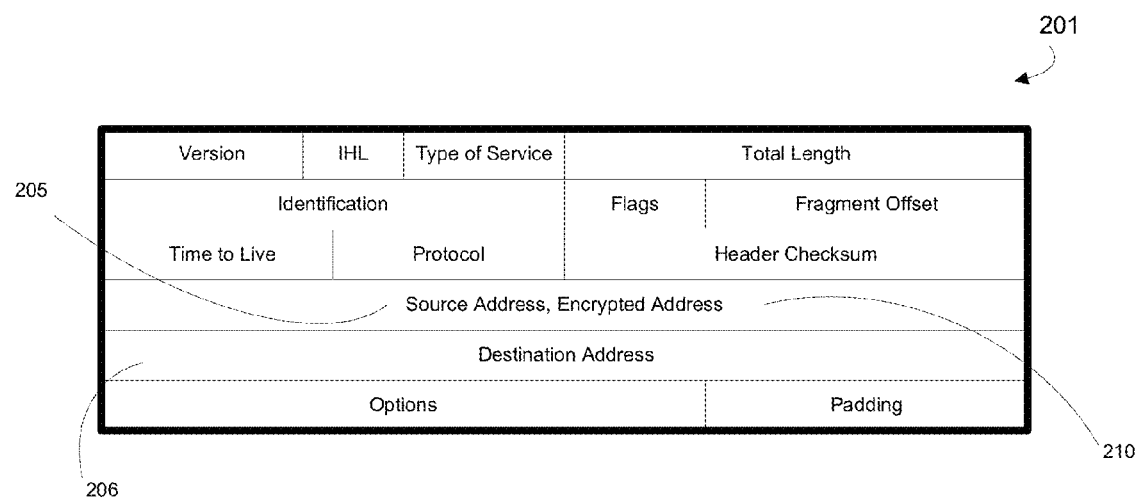

FIGS. 2a and 2b illustrate exemplary packet headers. Generally, but not necessarily, headers 200 and 201, as shown, are an Internet Protocol version 4 (IPv4) packet. Alternatively, Internet Protocol version 6 (IPv6), or some other packet may be implemented. Headers 200 and 201 include fields that further describe request 140 such as source address 205, from which request 140 originated, as well as a destination address 206.

In general, a network connection between a source host and a destination host, e.g., customer premises 105 and a service provider generally occurs according to the Open Systems Interconnection model (OSI model). The OSI model includes seven layers, each layer performing a different function and providing a service to the layer above it.

For example, layer 3, or the network layer, performs network routing functions by sending data from a source to a destination. In the current context, layer 3 delivers source address 205 of request 140 to edge server 125. Layer 2, on the other hand, is the data link layer and transfers data between the user and the service provider, as well as performs error checking. Layer 7, or the application layer, may perform software applications such as identifying the user, and determining resource availability.

FIG. 2a illustrates an exemplary header 200 as it is received by the edge server 125. FIG. 2b illustrates an exemplary header 201 as it is forwarded by edge server 125. Edge server 125 reads source address 205 from the network layer packet, e.g., the IP address delivered via the layer 3 header. Edge server 125 then encrypts source address 205 and writes encrypted address 210 to header 201, e.g., in a same field as is used to store source address 205. The encryption may be an AES encrypted hash value as described above. Header 201 is then forwarded to the service provider's request processing server 135. Thus, edge server 125 writes an additional value, encrypted address 210, to header 201. In some implementations, edge server 125 may write both source address 205 and encrypted address 210 to header 201 using one way hash encryption (MD5 or SHA-1), the same encryption scheme may be used during the source address 205 and encrypted address 210 authentication process. Additionally, data store 130 uses source address 205 to identify the user and locate subscription information associated with the user.

FIG. 3 illustrates an exemplary process 300 for authenticating and authorizing requested content. The process begins in a step 305 in which request 140 is received from user device 110 via edge server 125.

The service provider may be sure that the source address 205 included in request 140 is the actual source address 205 associated with a subscriber and not merely a copy or "spoof". "Spoofing" may occur when an unauthorized user copies a network address such as an IP address with the purpose of impersonating another computer system in order to gain access to a program, website, application, or the like. Often, spoofing occurs at the application layer, or layer 7 of the OSI model. In practice, it is easier to modify the contents of layer 7/application content than it is to modify lower level protocol header data. Edge server 125 prevents or inhibits spoofing by serving as a gateway between the home network and the desired content, as described below. Edge server 125 reads source address 205 from layer 3 of the OSI model, layer 3 information being more difficult to copy than higher layer information. Further, to protect against the unlikely event that source address 205 is being spoofed, edge server 125 also writes encrypted address 210 to header 201, as described below.

Next, in step 315, edge server 125 inserts source address 205 and encrypted address 210 into header 201. Encrypted address 210 is generated, e.g., as described above, from source address 205 using the encryption scheme implemented on server 125 and 135. Using an encryption process such as AES or 3 DES, as explained previously, edge server 125 deposits a hash value into the header 201. By applying the encryption scheme to source address 205 and inserting encrypted address 210 into header 201 via edge server 125, header 201 includes an additional identifier resistant to being duplicated, or "spoofed." Thus, even if source address 205 were overwritten, encrypted address 210 could not be made to match the source address 205 without access to the encryption key.

Next, in step 320, request processing server 135 receives request 140 and reads both source address 205 and encrypted address 210 from header 201. Request processing server 135 applies the same encryption scheme that was applied by edge server 125 in step 315, and decrypts encrypted address 210.

Next, in step 325, request processing server 135 compares the decrypted address with source address 205. If the addresses match, the process proceeds to step 335. If the values do not match, then the process proceeds to step 330.

In step 330, if the source address 205 does not match the decryption of the encrypted address 210, request processing server 135 provides an error message to user device 110 indicating that the server 135 was unable to authenticate request 140. The error message may be displayed via the interface on user device 110, played through speakers included on the user device 110, etc. The error message may display a reason for the denial of request 140 and may also provide contact information for the service provider.

In step 335, if the source address 205 and the decryption of the encrypted address 210 were matched in step 325, the source address 205 has been validated and is passed to server 135 for further authorization.

Next, in step 340, request processing server 135 looks up source address 205 in data store 130. If the address 205 is found, then the data store 130 retrieves user profile and usage information associated with source address 205, as described previously with respect to FIG. 1. For example, source address 205 may be linked to a user account number, name, or other means of identification, as well as subscription information. By locating a user profile associated with source address 205, server 135 may authorize the request 140, i.e., determine that the user is registered with the service provider and permitted to receive the requested service. If a user profile is found, process 300 proceeds to step 350, otherwise process 300 proceeds to step 345.

In step 345, if source address 205 was not found, server 135 provides user device 110 with an error message indicating that request 140 is not authorized. Alternatively, the user may be given the opportunity to prove that he or she is authorized to receive the requested object and be prompted to enter his or her credentials in order to access the object. For example, the user may be prompted to enter a username/password to access the requested object.

In step 350, if source address 205 was found, request processing server 135 compares request 140 with subscriber-specific authorization data in data store 130. Authorization rules may be used by the service provider to determine the levels of service associated with the user making request 140. Authorization rules may be included within the user profile and may be sent to data store 130 by request processing server 135. Authorization rules may also be based on subscription information or the user profile stored in data store 130. Authorization rules may be defined in the user profile and may include a rule for granting access to a specific user request. For instance, the authorization check may establish via the user profile, what services the user has subscribed to. For example, a user may be authorized to access premium subscription channels or on-demand TV services. Thus, if request 140 is for accessing HBO, and the user has subscribed to and paid for the channel, the authorization rule will grant request 140. On the other hand, if the user has not subscribed to the premium channel, the authorization rule may deny request 140. Additionally, if a user is not authorized to access a specific level of service, but is otherwise a paying customer, the user may be prompted to purchase the service, or content, for an additional fee. The option to purchase a service otherwise not subscribed to may be indicated to the user via the user interface, and likewise the user may accept or decline the invitation for the specific level of service through the user interface.

Next, in step 355, if the user is authorized to access the requested service, or view the requested content, then process 300 proceeds to step 365, otherwise, process 300 proceeds to step 360.

In step 360, if the user is not authorized to view the content or access the service, an error message is displayed. Again, the error message may be displayed on user device 110, or played through the speakers of user device 110. The error message may display a reason for the denial of the authorization and may also provide contact information for the service provider.

In step 365, if the user is authorized to view the content or access the service, request 140 can be fulfilled, for example, the content is displayed via user device 110. For example, if the user requested to access a web page via a tablet computer, the web page would be presented on the same. Alternatively, if the user requested to stream certain video content, such as a pay per view movie, the movie would be presented. The content, once authorized for viewing, may automatically be transmitted and/or displayed on multiple user devices 110. For example, once a user requests to view certain video content, and that content is authorized, the user may view it on the authorized device, e.g., television, tablet computer, or smart phone.

Following step 365, the process 300 ends.

In addition to authorizing services based on source address 205, system 100 may also implement additional safeguards to protect against unauthorized use. For example, an unsecured wireless network could be susceptible to theft. For instance, a nearby neighbor could 'borrow' wireless service from the user's home network. To prevent this, gateway 115 may be configured to deny service to any unsecured wireless network. Thus, if the home network is unsecured, e.g., not configured for wireless encryption, for example using Wired Equivalent Privacy (WEP) or WiFi Protected Access (WPA), or not configured with a MAC address access control list, the service will be unavailable to anyone, authorized or not, until the network has been secured. By demanding that customers secure their networks, the service provider can prevent multiple dwelling units from using the same network and thus preventing unauthorized use.

Additionally, the system 100 may provide an on-line help option or tutorial describing the steps necessary to secure gateway 115. A disclaimer may also be presented to the user informing the user of the risks associated with utilizing an unprotected wireless network. The disclaimer may be presented once, or on every use, before the system proceeds to the authentication step. The disclaimer dialog box may include an acknowledgement button, and the user's response may then be recorded and saved as part of the user data in data store 130. The system may continue to periodically check all user devices 110 within the home network to verify that they are still secured. The system may also periodically check gateway 115. This may be done using Technical Report 069 (TR-69 functions). TR-69 is a bidirectional HTTP based protocol that may provide for communications between customer premises 105 and the service provider. TR-69 permits devices within customer premises 105 to be configured without user input. TR-69 essentially controls certain configurations and settings at customer premise 105. In addition to verifying that a network is secure, system 100 may generate an alert notifying the user via user device 110 that the network is unsecured. Anyone of these safeguards may be implemented separately or in conjunction with each other.

Difficulties may arise when customer premises 105 is located in a multi-dwelling unit such as an apartment or condominium complex. In this instance, devices outside the customer premises 105 may be able to access the service provider through gateway 115. One way to limit unauthorized use would be to limit the number of simultaneous or near-simultaneous requests 140 per customer premises 105. For example, a single source address 205 could only be permitted to stream video on two devices 110 concurrently without being prompted for a username/password. Alternatively, any additional request to access a certain service beyond the permitted number may automatically be denied. This method may also be implemented to prevent against downstream or daisy-chained routers.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description.

The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a computer having a processor and a memory configured to:
receive a request to access an application, the request having a header, wherein the header includes a source address stored in a header field and an encrypted address generated based on the source address and written in the same header field as is used to store the source address, wherein the encrypted address is generated at an edge server distinct and remote from the computer by applying an encryption key to the source address, and wherein the request is received form the edge server after the encrypted address has been generated;
generate a decrypted address from the encrypted address by applying the encryption key to the encrypted address;
determine whether the source address and the decrypted address match;
transmit the source address to a data store; and
determine whether a customer profile corresponding to the source address is found within the data store.

2. The system of claim 1, the computer system further configured to display an error message to a user device from which the request originates in response to the source address and decrypted address being different.

3. The system of claim 1, the computer system further configured to authorize the request associated with the source address based on subscription information in the customer profile.

4. The system of claim 3, the computer system further configured to transmit the requested application to a user device in response to the request being authorized, the user device being associated with the source address.

5. The system of claim 1, wherein the request is at least one of a request to launch an application or a request to access a web page.

6. The system of claim 1, the computer system further configured to provide an error message to a user device from which the request originates in response to the customer profile not being found.

7. The system of claim 1, the computer system further configured to transmit an updated source address to the data store.

8. The system of claim 1, wherein the request is generated according to an Open System Interconnection model including seven layers, and the edge server is configured to read the source address from layer 3 of the model.

9. The system of claim 1, wherein the encryption key is a secret key shared only by the computer and the server.

10. A method, comprising:
receiving at a computer, a request to access an application, the request having a header, wherein the header includes a source address stored in a header field and an encrypted address generated based on the source address and written in the same header field as is used to store the source address, wherein the encrypted address is generated at an edge server distinct and remote from the computer by applying an encryption key to the source address, and wherein the request is received from the edge server after the encrypted address has been generated;
generating a decrypted address from the encrypted address by applying the encryption key to the encrypted address;
determining whether the source address and the decrypted address match;
transmitting the source address to a data store; and
determining whether a customer profile corresponding to the source address is found within the data store.

11. The method of claim 10, further comprising providing an error message to a user device from which the request originates in response to the source address and decrypted address being different.

12. The method of claim 10, further comprising authorizing the request associated with the source address based on subscription information in the customer profile.

13. The method of claim 12, further comprising transmitting the requested application to a user device in response to the request being authorized, the user device being associated with the source address.

14. The method of claim 10, wherein the request is at least one of a request to launch an application or a request to access a web page.

15. The method of claim 10, further comprising displaying an error message in response to the customer profile not being found.

16. The system of claim 10, further comprising transmitting an updated source address to the data store.

17. A non-transitory computer-readable medium comprising a set of computer-executable instructions tangibly embodied thereon, the instructions including instructions for:
receiving at a compute, a request to access an application, the request having a header, wherein the header includes a source address stored in a header field and an encrypted address generated based on the source address and written in the same header field as is used to store the source address, wherein the encrypted address is generated at an edge server distinct and remote from the computer by applying an encryption key to the source address, and wherein the request is received from the edge server after the encrypted address has been generated;
generating a decrypted address from the encrypted address by applying the encryption key to the encrypted address;
determining whether the source address and the decrypted address match;
transmitting the source address to a data store; and
determining whether a customer profile corresponding to the source address is found within the data store.

18. The medium of claim 17, the instructions further comprising instructions for displaying an error message to a user device from which the request originates in response to the source address and decrypted address being different.

19. The medium of claim 17, the instructions further comprising instructions for authorizing the request associated with the source address based on subscription information in the customer profile.

20. The medium of claim 19, the instructions further comprising instructions for transmitting the requested application to a user device in response to the request being authorized, the user device being associated with the source address.

21. The medium of claim 17, wherein the request is at least one of a request to launch an application or a request to access a web page.

\* \* \* \* \*